United States Patent [19]

Mielke et al.

[11] Patent Number: 5,294,480
[45] Date of Patent: Mar. 15, 1994

[54] MOLDINGS OR SHEETS MADE FROM SILICA AEROGELS

[75] Inventors: Manfred Mielke, Heidelberg; Guenther Seybold, Neuhofen, both of Fed. Rep. of Germany

[73] Assignee: BASF Aktiengesellschaft, Ludwigshafen, Fed. Rep. of Germany

[21] Appl. No.: 4,605

[22] Filed: Jan. 14, 1993

[30] Foreign Application Priority Data

Jan. 20, 1992 [DE] Fed. Rep. of Germany ....... 4201306

[51] Int. Cl.$^5$ .................................................. B32B 5/16
[52] U.S. Cl. .............................. 428/240; 252/315.01; 252/315.6; 423/338; 428/241; 428/244; 428/255; 428/280; 428/281; 428/283; 428/297; 428/323; 428/331
[58] Field of Search ............... 428/283, 252, 240, 241, 428/244, 255, 280, 281, 283, 297, 323, 331; 252/315.01, 315.6; 423/338

[56] References Cited

U.S. PATENT DOCUMENTS

| | | | |
|---|---|---|---|
| 2,093,454 | 9/1937 | Kistler | 252/6 |
| 4,327,065 | 4/1982 | von Dardel et al. | 423/338 |
| 4,402,927 | 9/1983 | Dardel et al. | 423/335 |
| 4,432,956 | 2/1984 | Zarzycki et al. | 423/338 |
| 4,667,417 | 5/1987 | Graser et al. | 34/9 |

*Primary Examiner*—James J. Bell
*Attorney, Agent, or Firm*—Keil & Weinkauf

[57] ABSTRACT

A molding based on supercritically dried silica aerogel parts in the form of spherical particles having a diameter of from 0.1 to 10 mm or sheet-like pieces having a thickness of from 2 to 30 mm and a diameter of from 1 to 5 cm, wherein the molding is produced by pressing at from 500° to 1000° C. and at from 0.5 to 10 bar, if necessary under a protective gas, such as nitrogen, without addition of binders.

16 Claims, No Drawings

MOLDINGS OR SHEETS MADE FROM SILICA AEROGELS

The outstanding product properties of supercritically dried silica aerogel parts are in the combination of high light transparency and low thermal conductivity ($\lambda$ 10° C. = 0.023 W/mK).

Aerogel can therefore advantageously also be introduced as a transparent insulating material into double glazing in order to reduce the heat-loss coefficient of the latter.

In the preparation of silica aerogels, the lyogel containing the liquid phase is converted under supercritical conditions into a gel, the aerogel, containing only a gaseous phase. Irrespective of the starting materials, whether sodium silicate (waterglass) and sulfuric acid, or organosilicon compounds and acids, the condensation reaction via a sol-gel process must be followed by drying which causes no shrinkage of the porous gel structure. The preparation of aerogels has already been described in detail in a large number of patents, for example in U.S. Pat. Nos. 2,093,454, 2,188,007, 2,249,767 and 3,434,912.

The supercritical conditions to be observed for this special drying require technically complex reaction autoclaves which must withstand very high pressures and temperatures.

The technical complexity is considerably increased if the aerogel is to be prepared in the form of large-format sheets or moldings in a high-pressure reactor, as described in U.S. Pat. Nos. 4,327,065, 4,402,927, 4,432,956 and 4,610,863. The space-time yield is uneconomic for relatively large moldings having an edge length of greater than 10 cm due to the process parameters to be observed during supercritical drying, such as the following of time-consuming temperature and pressure curves, and the opening and closing of large high-pressure-tight inlets and outlets.

It is more advantageous to subject small aerogel particles of various shapes, ie. in the form of beads or platelets having a diameter of a few millimeters or centimeters, to these supercritical conditions, as, for example, in U.S. Pat. No. 4,667,417.

Said particle shapes and sizes are significantly easier to handle and can be moved through the high-pressure reactor in an economically more favorable space-time yield.

The disadvantage of this process is that the aerogel is no longer produced in the form of relatively large sheets or moldings, but instead only as a bulk material.

Attempts to bind aerogel beads or platelets using various adhesives have the considerable disadvantage that the moldings which can be produced in this way are virtually opaque to light, and an important material property of the aerogel is thus lost.

It is an object of the present invention to prepare self-supporting moldings or sheets from an aerogel having a particle size of from millimeters to centimeters.

We have found that this object is achieved by the features of patent claims 1 to 15.

Attempts to simple press the aerogel beads results in high densities from 300 to 600 kg/m$^3$, which are undesired for physical reasons, since precipitation silicic acids dried as lyogels under normal conditions give silica gels or, in general, xerogels, which reach this density range even without supercritical drying, but do not have the excellent properties of the aerogel with respect to light transparency and thermal conductivity.

However, it has now been found that the aerogel can be bound even without addition of adhesives to give light-transparent moldings if the material is additionally subjected to elevated temperatures at the same time as it is subjected to the pressure.

Pressing of aerogels in a oven at from 500 to 1000° C. and from 0.5 to 10 bar allows self-supporting sheets or moldings to be produced. The pressing pressure on the aerogel layer can be generated simply by lowering appropriate weights on movable pistons or by means of a hydraulic press. The thermally pressed aerogel moldings comprise bead-form particles having a diameter of from 0.05 to 8 mm. The upper and lower surfaces of these platelets have the geometrical shape of equilateral triangles, of squares or of hexagons or octagons.

The moldings produced in this way are protected in the remainder of the production process against external influences such as contact with water or mechanical damage by external lamination with transparent plastic sheets or films of various polymeric materials, such as polymethyl methacrylate, polyurethane, polyacrylate, polycarbonate, polyvinyl chloride, polyvinyl fluoride, polyvinylidene chloride, polyvinylidene fluoride, polytetrafluoroethylene, ethylene-tetrafluoroethylene copolymers, polyether sulfone, polyethylene glycol terephthalate or silicone rubbers, or by quartz, mica or glass sheets of various compositions.

This lamination of the aerogel surface can be carried out by thermal application of pressure below or a few degrees above the softening point of the polymer or glass layer, but alternatively by evacuation of the enveloping films or sheets.

The aerogel sheets may, in addition, advantageously be reinforced externally or internally by laying mats or woven fabric structures of glass or quartz in or on them, structures being used which substantially transmit the light with very little scatter.

For non-transparent applications, opacifiers such as carbon blacks, titanium dioxides, iron oxides ($Fe_3O_4$), micas, ilmenite and mixed oxides, may be added to the aerogel comprising particles having diameters from 0.1 millimeter to centimeters in order to improve the thermal conduction, particularly at above about 100° C.

EXAMPLE 1

Aerogel beads having a particle diameter of from 1 to 6 mm were pressed between two quartz sheets at 800° C. for 20 minutes in the presence of air to give various layer thicknesses of between 10 and 36 Mm. The aerogel densities were calculated as being about 160 kg/m$^3$ by subtraction of the quartz sheets.

The following transmission values were obtained at a wavelength of 550 nm in a Cary 14 spectrophotometer in front of the Ulbricht globe (illumination, directional 8°/measurement:diffuse directional) with compensation for the two quartz cells: 75% for a layer thickness of 10 mm, 48% for a layer thickness of 14 mm, 25% for a layer thickness of 24 mm and 10% for a layer thickness of 36 mm.

EXAMPLE 2

Ground, finely divided aerogel (diameter 120 $\mu$m) was pressed at 1.8 bar for 30 minutes at various temperatures from 300° to 900° C. The compacts at 300° and 400° C. were very brittle and had no inherent stability. From 500° to 900° C., good to very good mechanical strengths were achieved at test specimen densities of from 190 kg/m$^3$ for 500° C., 200 kg/m$^3$ for 700° C. and 245 kg/m$^3$ for 900° C. Depending on the pressing temperature, the compacts were brown at from 300° to 400° C., black at 500° C., partly black, partly white at 700° C. and completely white at 900° C. The black coloration observed in the aerogel is due to organic carbon residues, due to the preparation, which burns off in the presence of oxygen to give $CO_2$.

EXAMPLE 3

Aerogel beads having a diameter of from 1 to 6 mm were pressed for 20 minutes at 600° C. in the presence of air at 22.2 bar to give a density of 155 kg/m$^3$ or at 8.8 bar to give a density of 210 kg/m$^3$, giving pale brown moldings. At 800° C., under otherwise identical conditions, a density of 180 kg/m$^3$ was achieved at a pressure of 2.2 bar and a density of 230 kg/m$^3$ at a pressure of 8.8 bar, the aerogel moldings remaining light-transparent.

EXAMPLE 4

Aerogel particles colored white by means of 23% by weight of $TiO_2$ (rutile) and having a mean particle diameter of 1.3 mm were pressed for 20 or 60 minutes at 800° C. and 1.8 bar in the presence of air to give moldings having a density of 260 or 270 kg/m$^3$ respectively.

EXAMPLE 5

Aerogel particles colored black by means of 23% by weight of $Fe_3O_4$ and having a mean diameter of 1.3 mm were pressed for 20 minutes at 800° C. under nitrogen as protective gas to give stable moldings having a density of 300 kg/m$^3$.

EXAMPLE 6

Aerogel particles colored black by means of 13% by weight of carbon black and having a mean diameter of 1.3 mm were pressed for 20 minutes at 800° C. under nitrogen as protective gas to give stable moldings having a density of 200 kg/m$^3$.

EXAMPLE 7

Aerogel particles colored by means of 23% by weight of mica (muscovite, mean particle diameter 20 μm) and having a diameter of 1.3 mm were pressed for 20 minutes at 800° C. in the presence of air to give stable moldings having a density of 250 kg/m$^3$.

EXAMPLE 8

Aerogel particles colored by means of a mixture of 8.1% by weight of $TiO_2$, 8.1% by weight of $Cr_{1.4}Fe_{0.6}O_3$ and 4% by weight of Ca and having a mean diameter of 2.4 mm were pressed for 20 minutes at 800° C. under nitrogen as protective gas to give stable moldings having a density of 275 kg/m$^3$.

EXAMPLE 9

The aerogel moldings produced as described in Example 3 were additionally coated with silicone rubber (for example Elastosils from Wacker-Chemie). Light-transparent moldings having a millimeter-thin transparent protective coating were obtained.

We claim:

1. A molding based on supercritically dried silica aerogel parts in the form of spherical particles having a diameter of from 0.1 to 10 mm or sheet-like pieces having a thickness of from 2 to 30 mm and a diameter of from 1 to 5 cm, wherein the molding is produced by pressing at from 500° to 100° C. and at from 0.5 to 10 bar, without the additional of binders.

2. A molding as defined in claim 1 which is transparent to light.

3. A molding as defined in claim 1, which is pressed with quartz, mica or glass sheets to give a light-transparent element.

4. A molding as defined in claim 1, which is laminated with a transparent polymer layer based on polymethacrylate, polyurethane, polyacrylate, polycarbonate, polyvinyl chloride, polyvinyl fluoride, polyvinylidene chloride, polyvinylidene fluoride, polytetrafluoroethylene, ethylene-tetrafluoroethylene copolymers, polyether sulfone, polyethylene glycol terephthalate or silicone rubbers.

5. A molding as defined in claim 1, which contains finely divided carbon black as opacifier in an amount of from 5 to 20%.

6. A molding as defined in claim 1, which contains finely divided titanium dioxide (rutile) as opacifier in an amount of from 10 to 50%.

7. A molding as defined in claim 1, which contains finely divided $Fe_3O_4$ as opacifier in an amount of from 10 to 50%.

8. A molding as defined in claim 1, which contains finely divided mica (muscovite) as opacifier in an amount of from 20 to 40% by weight.

9. A molding as defined in claim 1, which contains finely divided ilmenite $FeTiO_3$ as opacifier in an amount of from 10 to 40% by weight.

10. A molding as defined in claim 1, which comprises aerogel beads having a diameter of from 2 to 6 millimeters.

11. A molding as defined in claim 1, which comprises aerogel beads having a diameter of less than 2 millimeters, preferably from 0.1 to 0.5 millimeters.

12. A molding as defined in claim 1, which comprises a mixture of coarse and fine aerogel beads, which are mixed in a volume ratio from 80:20 to 50:50 and pressed.

13. A molding as defined in claim 1, which is pressed with mesh-form quartz fiber or glass fiber woven fabric structures on the outside which fibers also penetrate the inside of the aerogel beads for mechanical reinforcement.

14. A molding as defined in claim 1, wherein quartz fibers, aluminum oxide fibers or aluminum silicate fibers having a thickness of up to 10 μm and a length of up to 5 cm are incorporated for further reinforcement.

15. A molding as defined in claim 1, wherein the dried silica aerogel parts are pressed under a protective gas.

16. A molding as defined in claim 15, wherein the protective gas in nitrogen.

* * * * *